United States Patent [19]

Stock et al.

[11] 4,119,073

[45] Oct. 10, 1978

[54] SPARK IGNITION FUEL INJECTION INTERNAL COMBUSTION ENGINE

[75] Inventors: Dieter Stock, Frankenbach; Johannes Steinwart, Obersulm-Willsbach, both of Fed. Rep. of Germany

[73] Assignee: Audi NSU Auto Union Aktiengesellschaft, Fed. Rep. of Germany

[21] Appl. No.: 739,254

[22] Filed: Nov. 5, 1976

Related U.S. Application Data

[63] Continuation-in-part of Ser. No. 713,702, Aug. 12, 1976, abandoned.

[51] Int. Cl.² ............................................. F02M 31/00
[52] U.S. Cl. ........................... 123/122 D; 123/139 AW
[58] Field of Search .............. 123/139 AW, 122 AB, 123/122 AC, 122 D; 261/145, 23 A, 41 C

[56] References Cited

U.S. PATENT DOCUMENTS

| 907,751 | 12/1908 | Duryea | 261/41 C |
|---|---|---|---|
| 2,055,925 | 9/1936 | Firth | 261/41 C |
| 2,430,693 | 11/1947 | Udale | 261/145 |
| 3,685,503 | 8/1972 | Jackson | 123/122 D |
| 3,850,153 | 11/1974 | Sigwald | 123/122 AB |
| 3,894,523 | 7/1975 | Stumpp | 123/139 AW |
| 4,009,701 | 3/1977 | Ruf | 261/145 |
| 4,016,845 | 4/1977 | Marsee | 261/145 |

*Primary Examiner*—Ronald H. Lazarus
*Attorney, Agent, or Firm*—Kane, Dalsimer, Kane, Sullivan and Kurucz

[57] ABSTRACT

A spark-ignition fuel-injection internal combustion engine is provided with a measuring member in its induction system to measure the air flow and a fuel injection nozzle in its induction system downstream of the measuring member.

12 Claims, 6 Drawing Figures

SPARK IGNITION FUEL INJECTION INTERNAL COMBUSTION ENGINE

REFERENCE TO RELATED APPLICATION

This application is a continuation-in-part of application Ser. No. 713,702, now abandoned filed Aug. 12, 1976.

BACKGROUND OF THE INVENTION

It is known that in engines of the kind described with port injection controlled by measurement of the air flow, it is possible to obtain a relatively accurate control of the fuel-air ratio. This makes it possible to reduce the polluting components present in the exhaust gases under almost all conditions of operation.

However, it has now been found that at low temperatures and in the cold-running phase and as a consequence of the losses due to deposition of liquid fuel in the region around the injection nozzle with a cold inlet port, and also in the combustion chamber, it is necessary to enrich the mixture to balance out this effect. However, enrichment of the mixture makes the exhaust gas quality unsatisfactory under these operating conditions, at least until the operating temperature is reached and until therefore the fuel that is deposited in the inlet port is re-evaporated. However, it has also been found that even when the engine has reached its operating temperature slight deposits of liquid fuel can still take place in the inlet port and then when there are changes in the load which result in an increase in the depression in the induction system, these deposits evaporate suddenly and are picked up and lead to enrichment of the mixture and the undesired consequences already mentioned.

SUMMARY OF THE INVENTION

The aim of the invention is to avoid the above-mentioned drawbacks of the known device and to provide an induction system for an engine of the kind stated in the introduction in which deposits of fuel in the region of the inlet port are largely eliminated and good mixing is achieved without affecting the fuel-air ratio.

This problem is solved according to the invention in that the induction system, which carries solely air, is split up into a part-load passage and a full-load passage and that a heater is arranged in a portion of the part-load passage that lies between the measuring member and the injection nozzle.

It is true that, in engines with carburetors, not fuel injection, it is known to supply the fuel-air mixture through separate part-load and full-load passages. In these engines pre-heating of the fuel-air mixtue is provided in order to prevent separation and deposition of fuel within the induction system. However in this case the pre-heating can only be very limited as any stronger heating can upset the fuel-air ratio and moreover lead to a fall in volumetric efficiency.

In the case of the present invention, by contrast, instead of a fuel-air mixture being heated, it is only air that is heated, and furthermore only that air which flows from the measuring member through the part-load passage. Because of this air which is relatively strongly heated by the heater and flows into the inlet port the fuel from the fuel injection nozzle is not deposited on the wall of the inlet port, which is heated by the air flow, but on the contrary this fuel is evaporated immediately into the air stream so that it is possible to form a very homogeneous and well pre-heated fuel-air mixture. Variation of the fuel-air ratio due to the heating cannot arise as the measuring member which sets a fuel delivery proportional to the quantity of air is mounted upstream, in the direction of the flow, of the part-load passage and upstream of the heater and accordingly the measurement of the air flow always takes place at the prevailing temperature of the measuring member. Even with a fall in the volumetric efficiency that might arise in the part-load range and originating from the heating, the fuel-air ratio remains constant by virtue of the fact that the measurement of the air flow is done at ambient temperature. A fall-off in volumetric efficiency manifested by a reduction in the power output of the engine can be counteracted by opening the throttle without upsetting the fuel-air ratio. By making use of this idea, quite apart from the improvement in mixture formation, in particular in the above-mentioned operating ranges in which the air flow is mainly through the part-load passage, there is good mixing, leading to a reduction in fuel consumption and therefore it makes enrichment of the mixture unnecessary and finally it reduces the quantity of pollution in the exhaust gas.

In a range of operation extending beyond the part-load condition and right up to full load the air that is heated in the part-load passage is brought together at the inlet port, according to the position of the throttle in the full-load passage, with the unheated air flowing through the full-load passage. As under these operating conditions the air flow in the part-load passage is also appreciably faster than before, the heat transfer is automatically of reduced intensity (even in the presence of an increase in the heat input from the heater resulting from the increased power output) and so no overheating of the air flow can arise and also in these ranges of operation it is possible to obtain effective mixing in the inlet port without losing volumetric efficiency. Accordingly there is no need to provide means for disconnecting the induction heating, such as is sometimes provided in known engines.

Where the engine is liquid-cooled, the heater can be formed by a heat exchanger connected to the coolant circuit of the engine. As the coolant heats up relatively quickly after the engine has started, and maintains a substantially predetermined temperature when the engine is running, correspondingly rapid and constant transfer of heat to the air flow can be achieved by this arrangement.

Alternatively the heater can be formed by a heat-transfer wall common to the part-load passage and the exhaust system. Such a construction is of advantage where the exhaust pipe runs over the induction system.

In an engine which has its exhaust system connected to a reactor, the heat-transfer wall is preferably in a region downstream of the reactor. The exhaust gases then meet the heat-transfer wall only when the reaction of the exhaust gases in the reactor has been largely concluded. In this way it is possible to avoid any disturbance of the reaction process by possible removal of heat in the heat-transfer process. As the exhaust gases are generally still at a very high temperature even after passing through the reactor, it is still possible to find a place for the heat-transfer wall that will give ample heat transfer to the part-load passage.

Further details and features of the invention are revealed by the following description in conjunction with the drawings which illustrate two embodiments of the invention by way of example.

DETAILED DESCRIPTION

Figure 1:
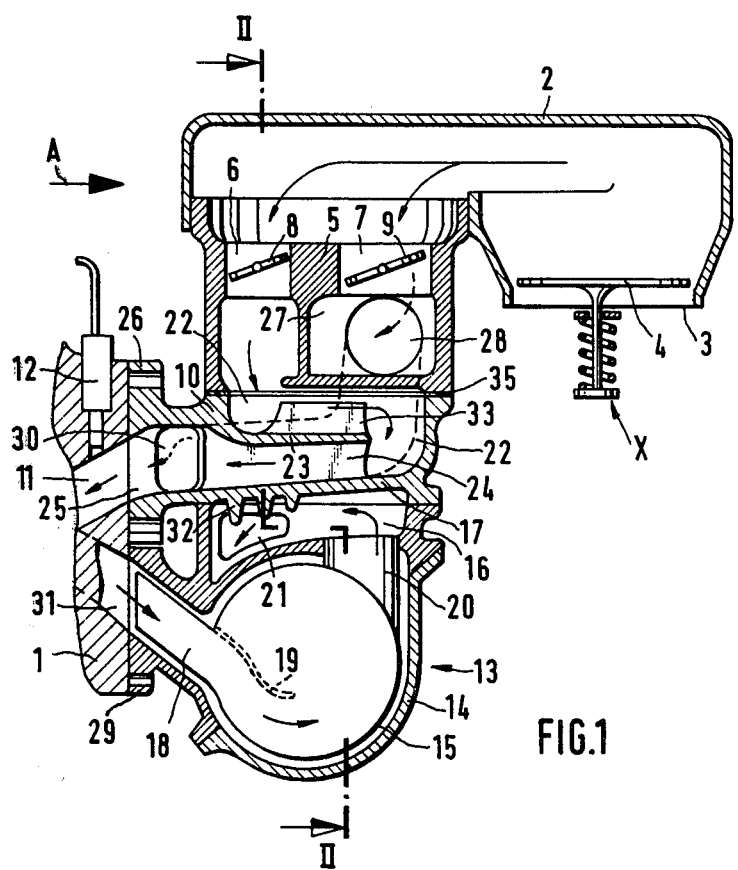
FIG. 1 is a cross section through the induction system of a fuel-injection internal combustion engine with measurement of the air flow and with a first form of heater, taken on the line I—I in FIG. 2.

Reference is made first to FIG. 1 in which the main components shown are the induction system and the exhaust system of a fuel-injection engine 1 (the latter being illustrated only partially), with provision for measurement of the air flow. The induction system comprises an induction pipe portion 2 through which air for combustion flows in the direction of the arrows. Mounted at the inlet end 3 of the portion 2 is a measuring member 4 which is displaced in a nearly linear function by the flow of air through the portion 2 and which cooperates at X with means, not shown, that adjust the quantity of fuel delivery to be proportional to the air flow in accordance with the position of the member 4. Following the portion 2 in the direction of flow is a second portion 5 which is split up into a part-load passage 6 and a full-load passage 7, each with its own throttle valve 8 and 9. The passages 6 and 7 extend vertically which means they are perpendicular to the main longitudinal axis of the engine. After passing through the part-load passage 6 and full-load passage 7 the air is guided through a third induction pipe portion 10, which is attached to the engine 1 by means of flange 26, and thence to the inlet ports 11 of the engine 1. Mounted in each inlet port 11 is a fuel injection valve which delivers the quantity of fuel necessary for the formation of a fuel-air mixture, under the control of the measuring member 4. To discharge the burnt gases from the engine there is an exhaust system formed by an exhaust port 31 which, in the embodiment shown, leads into a reactor 13 comprising a reactor chamber 15 enclosed by a housing 14. The reactor 13 is mounted directly on the engine 1 and attached to it by a flange 29. To heat the combustion air, the part-load passage in the portion 10 and an exhaust passage 16 that follows the reactor chamber 15, have a common heat-transfer wall 17. The wall 17 forms parts of the induction pipe portion 10 and simultaneously forms the upper wall of the exhaust passage 16 which at this point has a flanged engagement with the portion 10.

When the engine 1 is running heat is imparted to the heat-transfer wall 17 by the exhaust gas that flows in the direction of the arrow from the engine 1 through the exhaust port 31 via a tangential exhaust connection 18, that opens into the reactor chamber 15, first directly into the chamber 15. In the chamber 15 the gas is guided by a sheet metal guide 19 towards the wall of the reactor chamber 15 and simultaneously set into turbulent rotation to after-burn harmful components in the exhaust gas in a known way. Only when the reaction of the exhaust gases is largely complete does the hot exhaust gas flow through a stub 20 to the exhaust passage 16 and here, before passing to an exhaust pipe 21, it comes into contact with the heat transfer wall 17, ribs 32, extending in the direction of flow, being provided to increase the heat-transfer area. The air flowing through the induction pipe portion 10 into the engine 1 is thus strongly heated so that the fuel delivered by the nozzle 12 into the inlet port 11 cannot be deposited in the port 11 and accordingly is vapourised, with the result of improved mixture formation.

Figure 2:
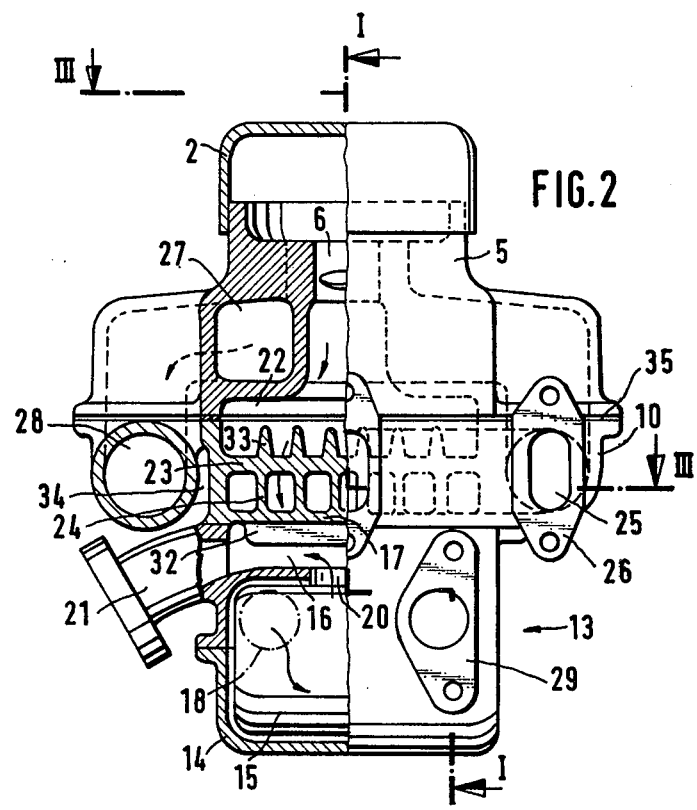
FIG. 2 is an elevation of the induction system of FIG. 1. looking in the direction of the arrow A in FIG. 1, the left-hand half being sectioned on the line II—II in FIG. 1.

As shown in FIG. 2 the air flowing through the part-load passge 6 passes from the induction pipe portion 5 through a chamber 22 in the portion 10 and this chamber 22 widens out substantially to the width of the exhaust passage 16. In the portion 10 the flow of air is turned through about 180° around an intermediate wall 23 so that the air can come into contact with the entire width and length of the heat-transfer wall 17 that forms one wall of the portion 10. This guiding of the air and the fact that in the region of the throttle valve 8 the part-load passage 6 is nearer to the engine than the full-load passage results in a relatively long heating zone which allows the air to be intensively heated before it passes through the inlet port 11 into the engine 1.

Figure 3:
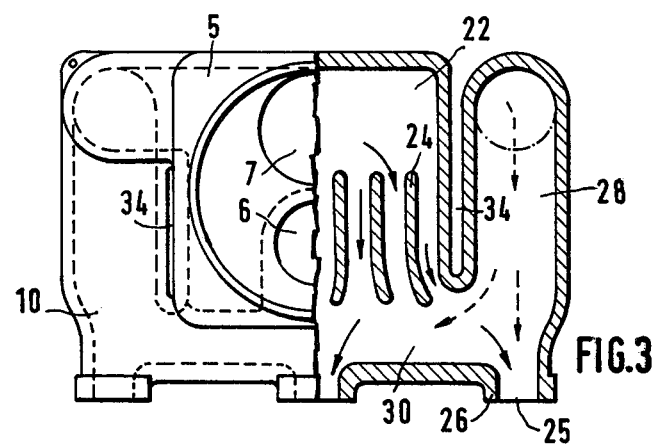
FIG. 3 is a plan view and partial section of the induction system on the line III—III in FIG. 2.

From FIG. 3, in which the induction pipe portion 2 is not shown, it will be seen that several guide webs 24 are mounted between the heat-transfer wall 17 and the intermediate wall 23 and these webs serve to guide and distribute the air that enters from the part-load passage 6 and the chamber 22, distributing it across a transverse passage 30 in the direction towards to the openings 25 in the flange 26 of the portion 10. The guide webs 24 and the previously mentioned ribs 33 projecting from the intermediate wall 23 into the part-load passage 6 both have the effect of increasing the surface area of the part-load passage that is connected to the heat-transfer wall 17 and thereby achieve transfer of heat to the passing air.

Figure 4:
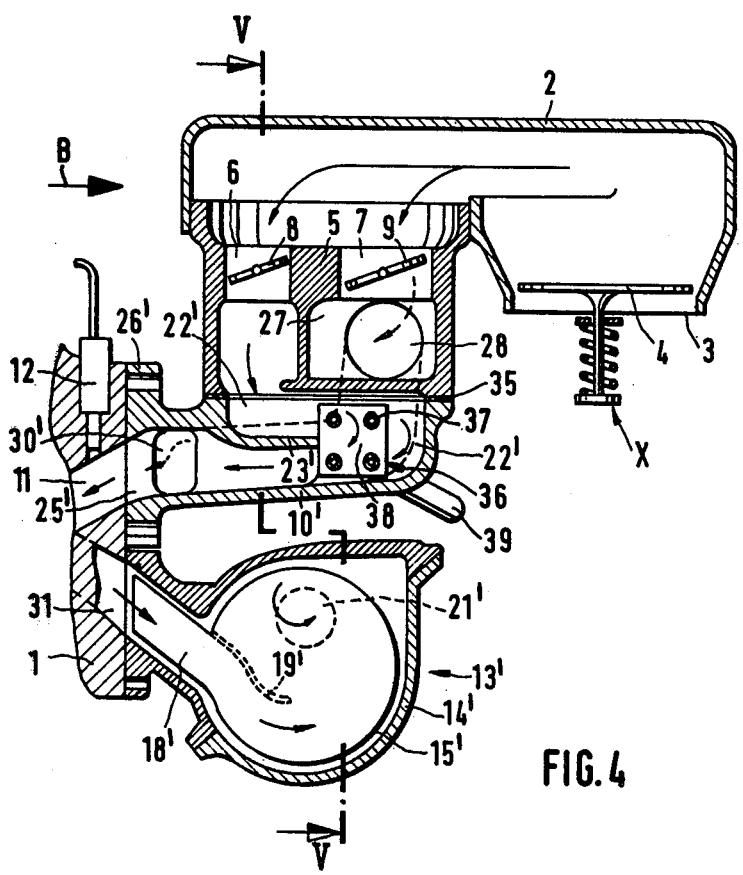
FIG. 4 is a cross-section through an induction system similar to FIG. 1, showing a second form of heater, and taken on the line IV—IV in FIG. 5.

In the embodiment illustrated in FIG. 4 the same reference numerals have been used as in FIG. 1 for the same parts and the same reference numerals but with an index mark have been used for similar parts. Departing from the embodiment shown in FIG. 1, the part-load passage for heating the air for combustion in the induction pipe portion 10' comprises a heater formed by a heat exchanger 36 connected to the coolant circuit of the engine 1, in which this case is liquid-cooled. The heat exchanger 36 which, in this embodiment, is of the tube type with several tubes 37 and a number of fins 38, is mounted in that part of the induction pipe portion 10' in which the air flowing from the part-load passage 6 into the chamber 22' is guided around an intermediate wall 23' in order to obtain a long heating zone. By this arrangement it is possible to provide within a small space a heat exchanger having a relatively large heat-transmitting surface area.

In contrast to the embodiment of FIGS. 1 to 3, in this embodiment there is moreover no connection between the reactor 13' and the induction pipe portion 10' as the heating of the combustion air is done by the heat exchanger 36. The exhaust gases coming from the engine 1 therefore pass through the exhaust port 31 and an exhaust stub 18' opening tangentially into the reactor chamber 15', and into the reactor chamber 15', which is not shown in section and which is enclosed in a casing 14'. To ensure after-burning the exhaust gas is set into turbulent rotation by a sheet metal guiding surface 19' and on completion of the reaction it flows out through the exhaust pipe 21'.

Figure 5:
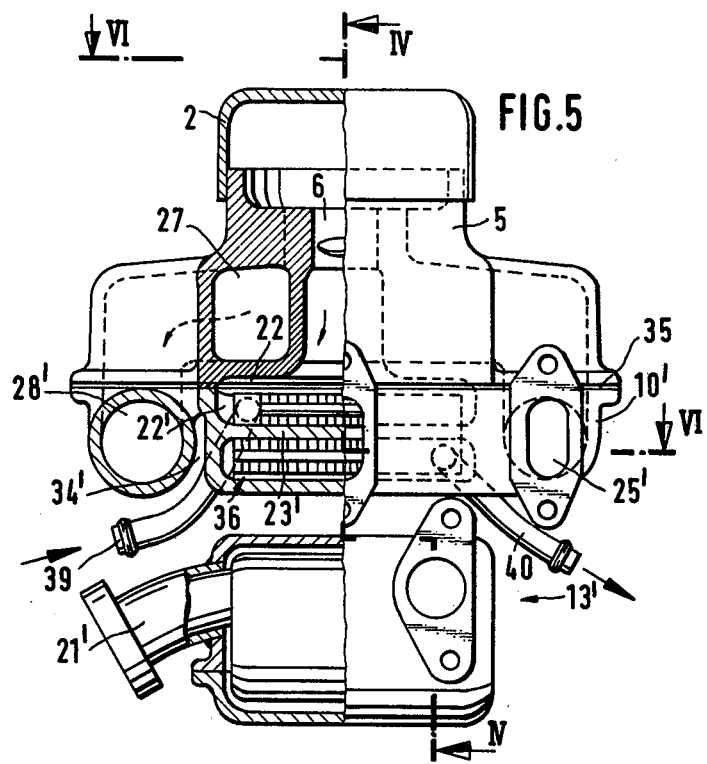
FIG. 5 is a view of the induction system of FIG. 4 looking in the direction of the arrow B, the left-hand half being sectioned on the line V—V in FIG. 4.

In FIG. 5 is shown how a supply connection 39 and an outlet connection 45 are provided for connecting the heat exchanger 36 to the coolant circuit. The heat exchanger 36 is connected in the circuit in such a direction that the heat exchanger 36 has the liquid passing through it in the direction of the arrow, corresponding to the direction of flow of the air through the part-load passage. This means that the air first meets the region of the heat exchanger 36 which the liquid enters through the connection 39 and it leaves the heat exchanger 36 in that region from which the liquid flows out through the connection 40.

Figure 6:
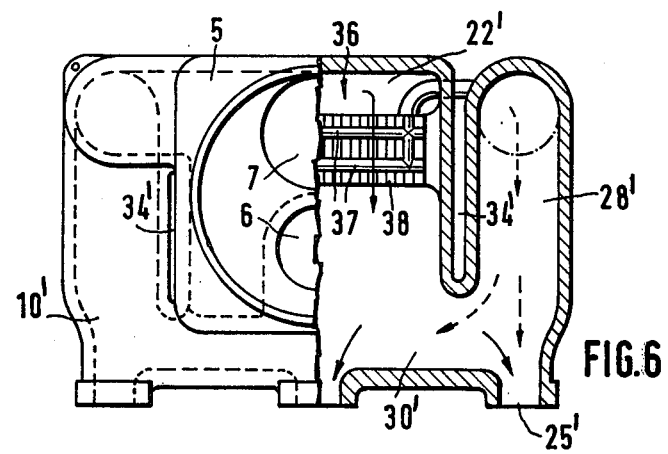
FIG. 6 is a plan view and section of the induction system of FIG. 4, taken on the line VI—VI in FIG. 5.

As shown in FIG. 6, the heat exchanger 36 extends over the whole of the cross sectional area of the chamber 22'. In this way the air for combustion is guided fully over and through the heat exchanger 36, to achieve rapid and intensive heat transfer to the air from the coolant, which heats up rapidly when the engine is running.

In the above examples the throttle layout is such that with progressively increasing air requirements first the throttle valve 8 is opened and only after that one is fully open does the throttle valve 9 start to open. This means that following a cold start and in the warming up phase and also during idling, i.e., when the air requirements are relatively low, the air passes only through the part-load passage 6 under the sole control of the throttle valve 8. In operation beyond the part-load range air flows through the full-load passage 7.

In order to reduce the flow of heated air on full-load an alternative layout for operating the throttle valves is such that by the time the valve 9 for the full-load passage 7 is fully open the valve 8 in the part-load passage 6 is almost closed again.

A heat-insulating gasket 35 is provided between the induction pipe portions 5 and 10 or 10' to prevent the heat from the portion 10 or 10' that has the heater in it from being transmitted to the full-load passage 7 and possibly leading to distortion of the throttle valves 8 and 9.

To follow the path of the combustion air after opening of the full-load passage 7 FIGS. 1, 2 and 3 or FIGS. 4, 5 and 6 must be looked at together. In this case the air for combustion flows in the direction of the arrow shown in broken lines, past the throttle valve 9 into a damping chamber 27 which is provided in the portion 5 and which balances out fluctuations which would otherwise have an adverse effect on the operation of the measuring member 4. From this damping chamber 27, the air passes to passages 28 or 28' which pass on both sides of the portion 5 and of the portion 10 or 10' with a positive clearance 34 or 34' in the region of the heater, and accordingly cannot pick up heat. The air emerging at relatively low temperature from the full-load passage 7 through the passages 28 or 28' and the heated air flowing in from the part-load passage 6, are mixed together in the region of the transverse passage 30 or 30' before entering the induction ports 11 through the openings 25 or 25'. This mixing avoids overheating of the combustion air, especially under full-load conditions, so good mixing can be obtained in the inlet ports 11 but without any fall in volumetric efficiency.

By pre-heating only the air flowing through part-load passage 6, the operation in this range is improved as the pre-heating prevents condensation. Because the air that is supplied through the full-load passage 7 is not pre-heated, there is no reduction in the volumetric efficiency at full load. Pre-heating in this range of operation is unnecessary anyway as the engine is already warm by then whilst the correct temperature for mixture formation is set by the mixing of the two air flows.

Thus the several aforenoted objects and advantages are most effectively attained. Although several somewhat preferred embodiments have been disclosed and described in detail herein, it should be understood that this invention is in no sense limited thereby and its scope is to be determined by that of the appended claims.

What we claim is:

1. In a spark-ignition fuel-injection internal combustion engine, with a measuring member in its induction system to measure the air flow and control the amount of fuel supplies to a fuel injection nozzle positioned in the induction system downstream of the measuring member, in which part of the induction system that carries solely air is split up into a part-load passage and a full-load passage and wherein the improvement comprise a heater provided in a region of the part-load passage that lies between the measuring member and the injection nozzle wherein the fuel from the fuel injection nozzle is evaporated immediately into the heated air stream so that it is possible to form a very homogeneous and well pre-heated fuel-air mixture.

2. An engine according to claim 1 in which the heater is formed by a heat-transfer wall which is common to the part-load passage and the exhaust system of the engine.

3. An engine according to claim 1 which is liquid-cooled and in which the heater is formed by a heater exchanger connected to the coolant circuit of the engine.

4. An engine according to claim 2 in which the part-load passage is longer than the full-load passage and turns through about 180° around an intermediate wall, the intermediate wall and the heat-transfer wall being connected together by guide webs.

5. An engine according to claim 4 in which the intermediate wall and the heat-transfer wall are provided on their faces that are directed away from one another with ribs that project into the part-load passage and into the exhaust system.

6. An engine according to claim 2 of which the exhaust system includes a reactor, and in which the heat-transfer wall is arranged in a region of the exhaust system that is downstream of the reactor.

7. An engine according to claim 3 in which the part-load passage is longer than the full-load passage and turns through about 180° around an intermediate wall, and in which the heat exchanger is arranged in that region of the part-load passage in which that passage turns.

8. An engine according to claim 7 in which the heat exchanger extends over the whole cross sectional area of the part-load passage.

9. An engine according to claim 7 in which the heat exchanger has a supply connection and an outlet connection which are arranged and connected to the coolant circuit in such a way that the heat exchanger has the liquid through it substantially in the same direction as the air in the part-load passage.

10. An engine according to claim 1 in which the part-load passage and the full-load passage each contain a throttle valve and extend substantially perpendicular to the longitudinal axis on the engine in this region, the part-load passage being nearer to the engine than the full-load passage, a clearance is provided between the wall of the full-load passage and the wall of the part-load passage in the region of the heater, and the full-load passage and the part-load passage, in the region of the induction system that follows the heater both open into a common passage which leads to the inlet ports of the engine.

11. An engine according to claim 10 in which the induction system includes a portion containing the throttle valves and a portion having the heater and that a heat-insulating gasket is provided between these portions.

12. An engine according to claim 10 in which the throttle valves are arranged so that the valve in the full-load passage only opens after the throttle valve in the part-load passage is fully open by the time the valve in the full-load passage is fully open the valve in the part-load passage is largely closed.

* * * * *

UNITED STATES PATENT AND TRADEMARK OFFICE
CERTIFICATE OF CORRECTION

PATENT NO. : 4,119,073
DATED : October 10, 1978
INVENTOR(S) : Dieter Stock and Johannes Steinwart It is certified that error appears in the above-identified patent and that said Letters Patent are hereby corrected as shown below:

At Column 6, Claim 1, line 26 after the word heater insert -- is --.

Signed and Sealed this

Twentieth Day of February 1979

[SEAL]

Attest:

RUTH C. MASON
Attesting Officer

DONALD W. BANNER
Commissioner of Patents and Trademarks